United States Patent [19]

Patel et al.

[11] Patent Number: 5,214,085

[45] Date of Patent: May 25, 1993

[54] ABRASION-RESISTANT COATING COMPOSITIONS WITH IMPROVED WEATHERABILITY

[75] Inventors: Gautam A. Patel, Clifton Park, N.Y.; Martin A. Trapp, Northville, Mich.

[73] Assignee: General Electric Company, Schenectady, N.Y.

[21] Appl. No.: 829,196

[22] Filed: Feb. 3, 1992

[51] Int. Cl.$^5$ .................................. C08K 5/3435
[52] U.S. Cl. ................... 524/102; 524/493; 428/412
[58] Field of Search ............... 524/102, 493; 428/412; 522/16, 75, 76, 148, 9

[56] References Cited

U.S. PATENT DOCUMENTS

| | | | |
|---|---|---|---|
| 3,981,897 | 9/1976 | Crivello | 522/31 |
| 4,136,102 | 1/1979 | Crivello | 522/31 |
| 4,265,723 | 5/1981 | Hesse et al. | 522/16 |
| 4,339,474 | 7/1982 | Kishida et al. | 522/75 |
| 4,348,462 | 9/1982 | Chung | 522/148 |
| 4,455,205 | 6/1984 | Olson et al. | 522/21 |
| 4,486,504 | 12/1984 | Chung | 522/84 |
| 4,491,508 | 1/1985 | Olson et al. | 522/44 |
| 4,863,802 | 9/1989 | Moore et al. | 548/261 |
| 5,112,890 | 5/1992 | Behrens et al. | 524/102 |

Primary Examiner—Veronica P. Hoke
Attorney, Agent, or Firm—William H. Pittman

[57] ABSTRACT

Non-gelling, radiation curable liquid coating compositions comprise at least one acrylic ester, preferably a mixture of a silyl acrylate and at least one polyfunctional acrylate; silica, preferably having an average particle size in the range of about 15-30 nm.; an initiator for ultraviolet radiation-induced curing and a hindered piperidyl ester such as bis(1-octyloxy-2,2,6,6-tetramethyl-4-piperidinyl) sebacate. The compositions also preferably contain an ultraviolet stabilizer, typically a benzophenone or benzotriazole. When employed as coatings for resinous (especially polycarbonate) articles and cured, said compositions provide abrasion resistance and weatherability.

20 Claims, No Drawings

ABRASION-RESISTANT COATING COMPOSITIONS WITH IMPROVED WEATHERABILITY

This invention relates to organic coating compositions curable by ultraviolet radiation. More particularly, it relates to organic coating compositions characterized by good abrasion resistance, weatherability and other desirable properties.

The employment of resinous film or sheet material such as polycarbonates and poly(methyl methacrylate) is known in the art. Many of these materials are transparent and are conventionally employed as replacements for glass. However, such resinous materials are easily scratched and abraded, one result of which may be a decrease in transparency.

Various methods for improving the abrasion resistance of resinous film or sheet material (hereinafter sometimes "substrate") have been developed. These include so-called "silicone hardcoats", which are thermally cured, and silicon compound-containing compositions which are capable of being cured by radiation, especially ultraviolet radiation. The radiation-cured compositions are particularly advantageous in many instances because of their short curing times, typically on the order of 2 minutes or less.

Many radiation-curable abrasion-resistant coatings are known in the art. For example, U.S. Pat. No. 4,455,205 discloses compositions comprising a silyl acrylate, aqueous colloidal silica, a photoinitiator and optionally a polyfunctional acrylate. Other materials which may be present include absorbers of ultraviolet radiation, employed as stabilizers.

Other types of radiation-curable coating compositions are disclosed in U.S. Pat. No. 4,486,504 (containing colloidal silica, a silyl acrylate, a glycidoxy-functional silane and a photoinitiator) and U.S. Pat. No. 4,491,508 (containing colloidal silica, a silyl acrylate, a polyfunctional acrylate and a photoinitiator). Both of these patents also disclose the optional presence of ultraviolet stabilizers or compounds convertible thereto. U.S. Pat. No. 4,863,802 discloses coating compositions of essentially the same types further containing an ultraviolet radiation-absorbing amount of a dimeric benzotriazole compound as a stabilizer. Similar compositions employing acylphosphorus compounds such as 2,4,6-trimethylbenzoyldiphenylphosphine oxide are disclosed in copending, commonly owned application Ser. No. 07/741,695, now U.S. Pat. No. 5,162,390, which additionally discloses the use of benzotriazoles and benzophenones as ultraviolet stabilizers.

More and more commonly, resinous film and sheet materials such as polycarbonates are employed outdoors. It thus becomes increasingly important to confer weatherability properties on the coatings therefor. Otherwise, prolonged exposure to sunlight, moisture and thermal cycling conditions can cause yellowing, delamination and formation of microcracks, decreasing transparency. These conditions are often noted in varying degrees in the compositions disclosed in the aforementioned patents and application, even when one of the properties mentioned is improved weatherability.

If minimum radiation-induced curing time were not an essential property of such coating compositions, weatherability could be improved by incorporating still greater amounts of ultraviolet stabilizers. However, while the latter are frequently necessary to inhibit discoloration of the resinous substrate, the proportions thereof must be kept low to avoid inhibition of the radiation curing operation.

Therefore, the incorporation of other types of stabilizing compounds, which are transparent to ultraviolet radiation and hence do not interfere with the curing process, might be expected to be advantageous. Such stabilizers include various hindered amines, typically various types of 2,2,6,6-tetraalkylpiperidines, many of which are known in the art. Incorporation of compounds of this type, however, frequently causes gelatin of the coating composition, substantially shortening its shelf life. This gelation may be the result of high basicity on the part of the hindered amine, or various types of interactions with other constituents of the coating composition.

Certain types of hindered amines may be incorporated in radiation-curable coating compositions without causing gelatin. They include hindered amine compounds of the following structures:

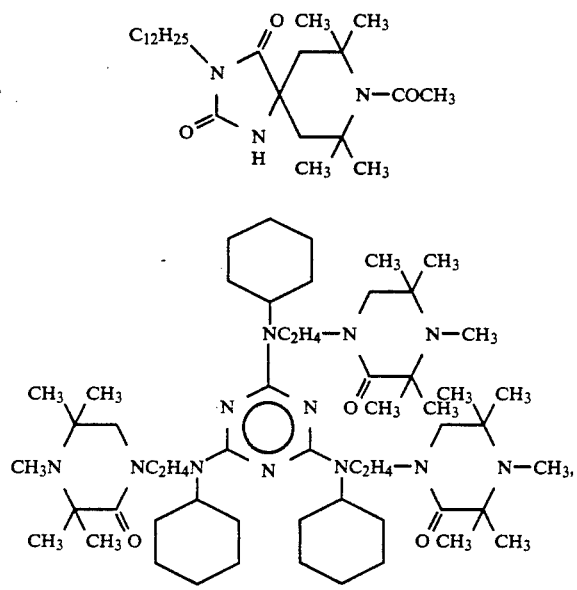

commercially available as "Tinuvin 440" (Ciba-Geigy Corp.) and "Good-Rite 3159" (B. F. Goodrich Co.), respectively. The effectiveness of these compounds to improve weatherability, however, is minimal or at best speculative. It is clear, therefore, that the choice of a suitable hindered amine for addition to a radiation-curable composition to improve weatherability is far from trivial.

The present invention is based on the discovery of a class of hindered amine compounds which may be incorporated in coating compositions such as those disclosed hereinabove without causing gelling thereof, and which additionally improve weatherability as demonstrated by a substantial decrease in microcracking, yellowing and delamination over prolonged periods. Such hindered amine compounds are characterized by the presence of a cyclic hindered amino ether moiety.

In one of its aspects, therefore, the invention includes non-gelling liquid coating compositions comprising (A) at least one acrylic monomer, (B) silica, (C) at least one initiator for ultraviolet radiation-induced curing of said composition, and (D) an amount effective to inhibit ultraviolet radiation-induced degradation of said composition, or the curing product thereof, of at least one hindered piperidyl ester of the formula

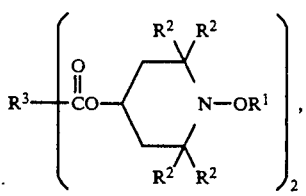

wherein $R^1$ is $C_{4-12}$ alkyl, $R^2$ is $C_{1-4}$ primary alkyl and $R^3$ is $C_{4-12}$ alkylene.

Reagent A in the compositions of this invention is at least one acrylic monomer. The term "acrylic monomer" generally includes esters and amides of acrylic acid, methacrylic acid and homologs and analogs thereof such as ethylacrylic, phenylacrylic or chloroacrylic acid. The preferred acids are acrylic and methacrylic, with acrylic generally being most preferred. The acrylic monomers are preferably esters; however, "acrylate" as used hereinafter includes methacrylates when the corresponding chemical formula so indicates.

Most often, at least a portion of the acrylic ester is a silyl acrylate. Suitable silyl acrylates include those of the formula

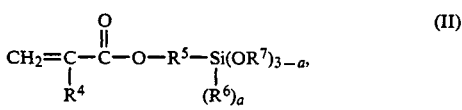

wherein $R^4$ is hydrogen or methyl, $R^5$ is $C_{1-8}$ alkylene, $R^6$ is $C_{1-13}$ alkyl or aryl, $R^7$ is $C_{1-8}$ alkyl and a is from 0 to 3. Especially preferred are acrylates wherein $R^4$ is methyl, $R^5$ is $C_{2-4}$ alkylene and especially trimethylene, $R^7$ is methyl and a is 0.

Reagent A may comprise, in addition to the acrylates of formula II, at least one polyfunctional acrylic monomer. Such monomers include compounds of the formula

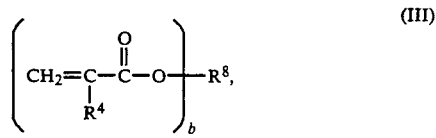

wherein $R^4$ is as previously defined and in this instance is preferably hydrogen, $R^8$ is a polyvalent organic radical and b is an integer from 2 to 6. The $R^8$ radical is most often an aliphatic radical having about 4–20 carbon atoms. Preferably, b is 2 and $R^8$ is alkylene, especially unbranched alkylene such as tetramethylene, hexamethylene or octamethylene.

Reagent B is silica ($SiO_2$), with silica having an average particle size in the range of about 5–80 nm. (corresponding to that of colloidal silica) and especially about 15–30 nm. being preferred. Colloidal silica is a dispersion of submicron-sized silica particles in an aqueous or other solvent medium; silica concentrations therein are typically in the range of about 25–50% by weight. When an aqueous silica dispersion is employed in the preparation of the composition of this invention, hydrolysis of at least a portion of the Si—O bonds in the silyl acrylate (when a is less than 3) is possible or even likely. Therefore, the compositions of this invention include those containing hydrolysis products of said silyl acrylate.

Reagent C is at least one initiator for ultraviolet radiation-induced curing (hereinafter sometimes "photoinitiator") of the coating composition. Many such photoinitiators are known in the art, and any are suitable for use according to the present invention. Thus, the photoinitiator may be chosen from the following types disclosed in the aforementioned patents and application and in U.S. Pat. Nos. 3,981,897 and 4,136,102:

Combinations of aromatic ketones such as acetophenone, benzophenone, xanthone benzoin compounds and the like and tertiary amines such as triethanolamine, methyldiethanolamine and 4-dimethylaminobenzophenone.

Cationic compounds including aromatic halonium, sulfonium and phosphonium salts.

Acylphosphorus compounds, which are frequently preferred. They include triorganobenzoyldiarylphosphine oxides, triorganobenzoyldiorgano phosphonates and triorganobenzoyldiarylphosphine sulfides. The phosphine oxides, especially 2,4,6-trimethylbenzoyldiphenylphosphine oxide, are often especially preferred.

Reagent D is at least one hindered piperidyl ester of formula I (hereinafter sometimes designated "hindered amine"), which also can be characterized as a cyclic hindered amino ether derivative. In said formula, $R^1$ is $C_{4-12}$ alkyl and most often primary alkyl, illustrated by n-butyl, n-pentyl, n-hexyl and n-decyl. The $R^2$ radical is $C_{1-4}$ primary alkyl (i.e., methyl, ethyl, n-propyl or n-butyl), with methyl being preferred, and $R^3$ is a $C_{4-12}$ alkylene radical such as hexamethylene, octamethylene or decamethylene, with octamethylene being preferred. The compound of formula I wherein $R^1$ is n-octyl, each $R^2$ is methyl and $R^3$ is octamethylene has the IUPAC name bis(1-octyloxy-2,2,6,6-tetramethyl-4-piperidinyl) sebacate and is commercially available under the designation "Tinuvin 123" (Ciba-Geigy Corp.).

The compositions of this invention may also contain other constituents, including surface active agents, thixotropic agents and dyes. A preferred constituent in most instances is an ultraviolet stabilizer of the type previously described and known in the art, including benzotriazoles and benzophenones. When employed, such ultraviolet stabilizers are present in an amount effective to inhibit ultraviolet degradation of the type leading to microcrack formation, delamination and yellowing, but not effective to substantially inhibit ultraviolet-induced curing of the composition.

In general, the compositions of this invention contain about 40–80% (by weight) acrylic monomer, all proportions herein being based on total reagents A and B. When reagent A is the combination of at least one silyl acrylate and at least one polyfunctional acrylate, they usually comprise about 5–20% and about 40–60% respectively. The balance of the combination of reagents A and B is silica.

Reagent C (the photoinitiator) generally comprises about 0.5–5.0%, and reagent D (the hindered piperidyl ester) about 0.1–4.0% of the composition. The ultraviolet absorber, when present, is most often employed in the amount of about 1–10%.

The compositions of this invention may be prepared by simply blending the various reagents in the desired proportions. If solvents are present and/or colloidal silica is the source of reagent B, volatiles may be removed by conventional operations such as vacuum stripping. The composition may then be applied by conventional techniques such as dipping, brushing, roller coating or flow coating to the plastic substrate, which is most often a polycarbonate or an acrylic resin such as poly(methyl methacrylate). The coating thus formed preferably has a thickness in the range of about 5-25 and typically about 10 microns.

Following application, the composition is cured by exposure to suitable radiation, typically ultraviolet radiation. Curing temperatures are not critical but may be within the range of about 25°-60° C. It is often convenient to employ a continuous line for coating and curing. Resinous articles coated with the compositions of this invention, as well as the curing products thereof, are other aspects of the invention.

The invention is illustrated by a series of examples in which a solution in 2-propanol of 50% (by weight) 1,6-hexanediol diacrylate, 10% 3-methacryloyloxypropyltrimethoxysilane and 40% colloidal silica (in the form of a 34% aqueous dispersion) was vacuum stripped to remove volatiles (including 2-propanol and water) and combined with 2-(2-hydroxy-5-t-octylphenyl) benzotriazole, 2-(2-hydroxy-3,5-di-t-amylphenyl) benzotriazole and 2,4,6-trimethylbenzoyldiphenylphosphine oxide in the amounts of 3.25%, 3.25% and 2%, respectively, and with varying proportions of "Tinuvin 123". The resulting compositions demonstrated no gelation upon storage, in contrast to similar compositions containing various other 2,2,6,6-piperidyl compounds which did exhibit gelation.

The liquid compositions were applied by roller coating to a 15-mil film of bisphenol A polycarbonate and the coated films were passed under mercury lamps at 43° C., employing a line speed of 610 cm./min. The coatings thus obtained were colorless and optically clear, showing initial haze values of about 0.1-0.2%.

They were also noticeably more abrasion resistant, as shown by the Taber Abrasion Test (ASTM procedure D1044, 500 g. weight, CS-10F wheels, 500 cycles) than a control composition containing no hindered amine. The haze percentages for four compositions containing 0.25-2.0% "Tinuvin 123" ranged from 5.2% tgo 5.7%, as compared with 6.3% for the control.

The test specimens were subjected to accelerated aging tests using an Atlas Ci35A xenon arc weatherometer, under the following conditions: Irradiation level (borosilicate inner/outer filters), 0.61 W/m.² at 340 nm.; 120 min. light cycle at 70% relative humidity and 50° C., followed by 24 min. dark cycle with water spray at 25° C. The yellowness index ("YI") and haze percentage were then determined. The results are given in Table I, in comparison with three controls tested by the same method: Control A, containing no hindered amine, and Controls B and C, containing "Tinuvin 440".

TABLE I

| | Control A | Ex. 1 | Control B | Ex. 2 | Control C |
|---|---|---|---|---|---|
| Hindered amine, % | — | 0.25 | 0.25 | 2.0 | 2.0 |
| YI/% haze at: | | | | | |
| 876 hrs. | 2.0/1.8 | 1.8/1.9 | 1.9/1.6 | 2.1/1.9 | 1.7/1.8 |
| 1751 hrs. | 4.4/6.6 | 3.0/2.8 | 4.1/7.3 | 3.1/3.1 | 3.1/5.1 |
| 2189 hrs. | 8.7/21.5 | 3.8/4.5 | 7.7/21.0 | 4.0/4.9 | 5.4/12.6 |
| 2646 hrs. | 13.3/39.6 | 5.1/7.5 | 13.6/34.8 | 5.7/9.9 | 11.8/44.1 |
| 3084 hrs. | 17.2/56.8 | 8.0/14.1 | 16.4/56.3 | 6.2/12.6 | 17.0/43.9 |

It is apparent that the control blends containing "Tinuvin 440" are not substantially less resistant to yellowing and haze formation than the control containing no hindered amine. On the other hand, the compositions of this invention are markedly superior to all controls in resistance to yellowing and haze formation.

In another series of examples, blends similar to those described above and containing "Tinuvin 123" in various proportions were aged in a QUV (UVA, 340 lamps) accelerated weaterometer cycling between 8-hour periods of exposure to ultraviolet light at 50° C. and 4 hours of moisture condensation in the dark at 45° C., and the times to initiation of microcracking were noted. The results are given in Table II.

TABLE II

| % hindered amine | Hours to microcracking |
|---|---|
| 0 | 3000 |
| 0.25 | 4000 |
| 0.5 | 4500 |
| 1.0 | 5600 |
| 2.0 | 6000 |

What is claimed is:

1. A non-gelling liquid coating composition comprising (A) at least one acrylic monomer, (B) silica, (C) at least one initiator for ultraviolet radiation-induced curing of said composition, and (D) an amount effective to inhibit ultraviolet radiation-induced degradation of said composition, or the curing product thereof, of at least one hindered piperidyl ester of the formula

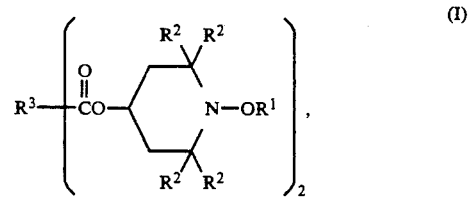

wherein $R^1$ is $C_{4-12}$ alkyl, $R^2$ is $C_{1-4}$ primary alkyl and $R^3$ is $C_{4-12}$ alkylene.

2. A composition according to claim 1 wherein reagent A comprises a silyl acrylate and at least one polyfunctional acrylate.

3. A composition according to claim 2 wherein reagent B has an average particle size in the range of about 15-30 nm.

4. A composition according to claim 3 wherein reagent C is selected from combinations of an aromatic ketone and a tertiary amine; aromatic halonium, sulfonium and phosphonium salts; and acylphosphorus compounds.

5. A composition according to claim 4 wherein reagent C is a triorganobenzoyldiarylphosphine oxide.

6. A composition according to claim 5 wherein the silyl acrylate has the formula

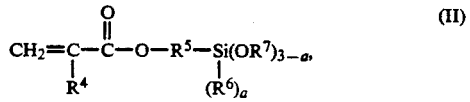

wherein $R^4$ is hydrogen or methyl, $R^5$ is $C_{1-8}$ alkylene, $R^6$ is $C_{1-13}$ alkyl or aryl, $R^7$ is $C_{1-8}$ alkyl and a is from 0 to 3.

7. A composition according to claim 6 wherein the silyl acrylate is 3-methacryloyloxypropyltrimethoxysilane.

8. A composition according to claim 5 wherein the polyfunctional acrylate has the formula

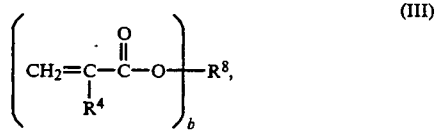

(III)

wherein $R^4$ is hydrogen or methyl, $R^8$ is a polyvalent organic radical and b is an integer from 2 to 6.

9. A composition according to claim 8 wherein the polyfunctional acrylate is 1,6-hexanediol diacrylate.

10. A composition according to claim 5 wherein the hindered piperidyl ester is bis(1-octyloxy-2,2,6,6-tetramethyl-4-piperidinyl) sebacate.

11. A composition according to claim 5 which also contains an ultraviolet stabilizer other than said hindered piperidyl ester.

12. A composition according to claim 11 wherein the other ultraviolet stabilizer is a benzotriazole or benzophenone.

13. A composition according to claim 11 which comprises about 5-20% silyl acrylate, about 40-60% polyfunctional acrylate, about 0.5-5.0% of reagent C, about 0.1-4.0% of reagent D and about 1-10% hindered piperidyl ester, all percentages being by weight and based on total reagents A and B excluding water.

14. A non-gelling liquid coating composition comprising about 5-20% 3-methacryloxypropyltrimethoxysilane, about 40-60% hexanediol diacrylate, silica having an average particle size in the range of about 15-30 nm., about 0.5-5.0% 2,4,6-trimethylbenzoyltriphenylphosphine oxide, about 0.5-5.0% bis(1-octyloxy-2,2,6,6-tetramethyl-4-piperidinyl) sebacate and about 1-10% of at least one benzotriazole as an ultraviolet absorber, all percentages being by weight and based on total 3-methacryloypropyltrimethoxysilane, hexanediol diacrylate and silica.

15. A resinous article coated with the composition of claim 1.

16. A resinous article coated with the composition of claim 5.

17. A resinous article coated with the composition of claim 10.

18. An article obtained by ultraviolet curing of an article according to claim 15.

19. An article obtained by ultraviolet curing of an article according to claim 16.

20. An article obtained by ultraviolet curing of an article according to claim 17.

* * * * *

UNITED STATES PATENT AND TRADEMARK OFFICE
CERTIFICATE OF CORRECTION

PATENT NO. : 5,214,085

DATED : May 25, 1993

INVENTOR(S) : Gautam A. Patel and Martin A. Trapp

It is certified that error appears in the above-identified patent and that said Letters Patent is hereby corrected as shown below:

Column 2, line 20, "gelatin" should read -- gelation --.

Signed and Sealed this

Eighteenth Day of January, 1994

Attest:

BRUCE LEHMAN

Attesting Officer

Commissioner of Patents and Trademarks